Nov. 13, 1956 C. E. BASSETT ET AL 2,770,374
APPARATUS FOR REFINING LEAD SCRAP
Original Filed April 6, 1951 3 Sheets-Sheet 3

INVENTORS
Cecil E. Bassett
Charles B. Bradfield
BY
ATTORNEYS

United States Patent Office 2,770,374
Patented Nov. 13, 1956

2,770,374

APPARATUS FOR REFINING LEAD SCRAP

Cecil E. Bassett and Charles B. Bradfield, Baton Rouge, La., assignors to Schuylkill Products Company, Inc., Baton Rouge, La., a corporation of Louisiana Original application April 6, 1951, Serial No. 219,628. Divided and this application April 23, 1953, Serial No. 358,282

2 Claims. (Cl. 214—18)

This invention relates to recovery of metal values from scrap lead. While certain features of the invention are of wide applicability, the equipment of the invention are particularly well suited to the refining of used battery plates.

In general it is of advantage in the refining of scrap lead to recover lead in relatively pure form, and especially to produce what is known as soft lead, i. e., lead having as low a content of antimony as is practicable.

The invention is highly effective for the purpose just mentioned and accomplishes the recovery of substantial quantities of lead having very low antimony content. The equipment of the invention can be used in a process capable of substantially continuous operation, which is of advantage in reducing the handling of scrap material and for other reasons.

In accordance with another aspect of the invention unusually convenient equipment is provided for the charging of the scrap lead and for the carrying out of the entire refining operation.

Briefly described, the process in which the equipment of the invention will be found especially useful is a two-stage process, each stage of which is accomplished in a simple form of reverberatory furnace, the lead scrap being charged into the first furnace and slag being tapped from the first furnace and directly delivered into the second furnace, the charging and slag tapping being performed at intervals in order to maintain substantially continuous operation of both furnaces.

By operating in this way and when utilizing certain other treatment conditions described more fully hereinafter, lead of a very high degree of purity may be tapped from time to time from the first furnace, and lead with an appreciable antimony content similarly tapped from time to time from the second furnace.

How the foregoing objects and advantages are attained will appear more fully from the following description referring to the accompanying drawings which illustrate in somewhat diagrammatic fashion the preferred arrangement of furnaces and other equipment utilized according to the invention.

In the drawings—

Figure 2:
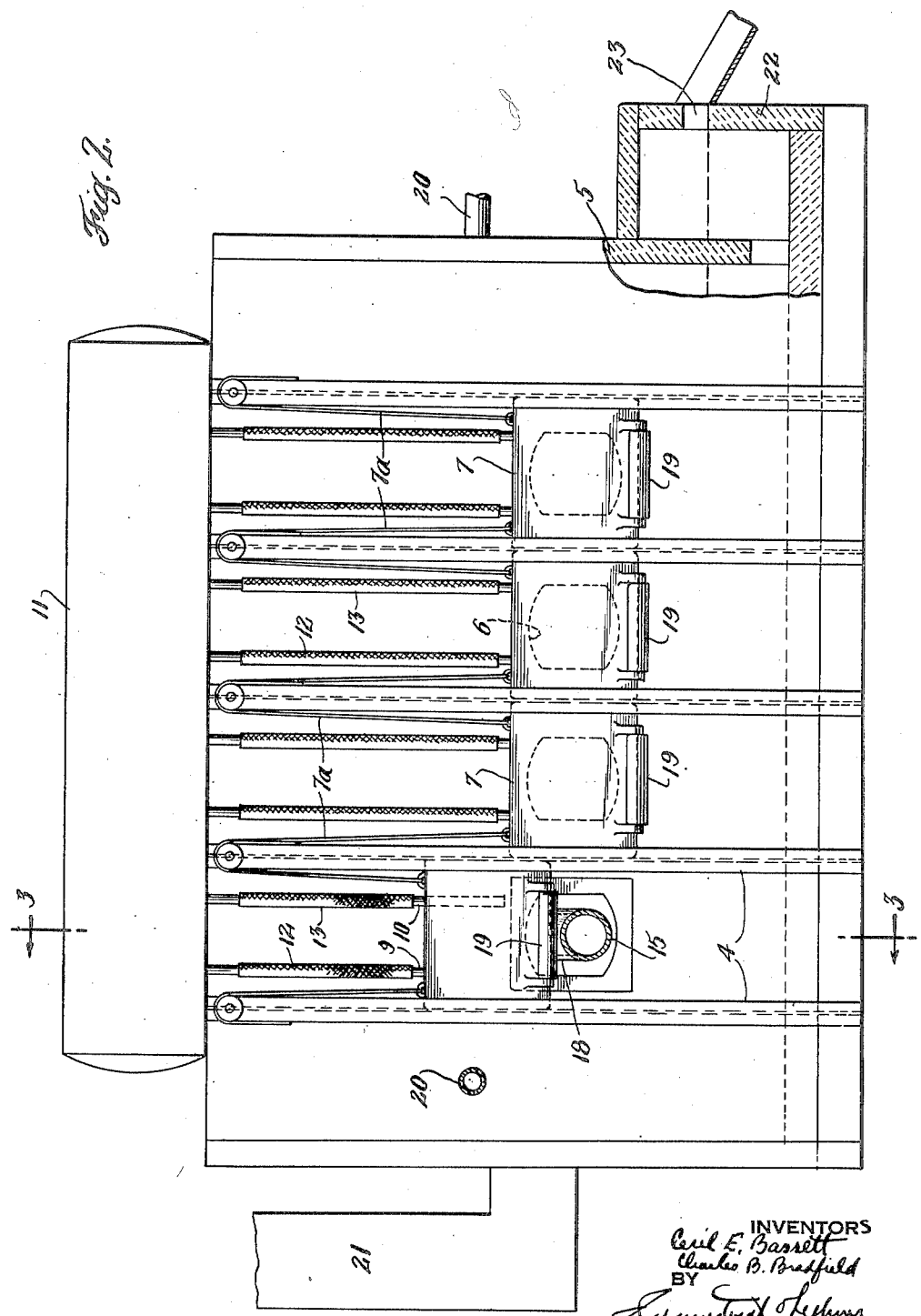
Figure 2 is a view to an enlarged scale of the first reverberatory furnace, this view being taken looking toward the right at the left hand furnace shown in Figure 1.
Figure 3:
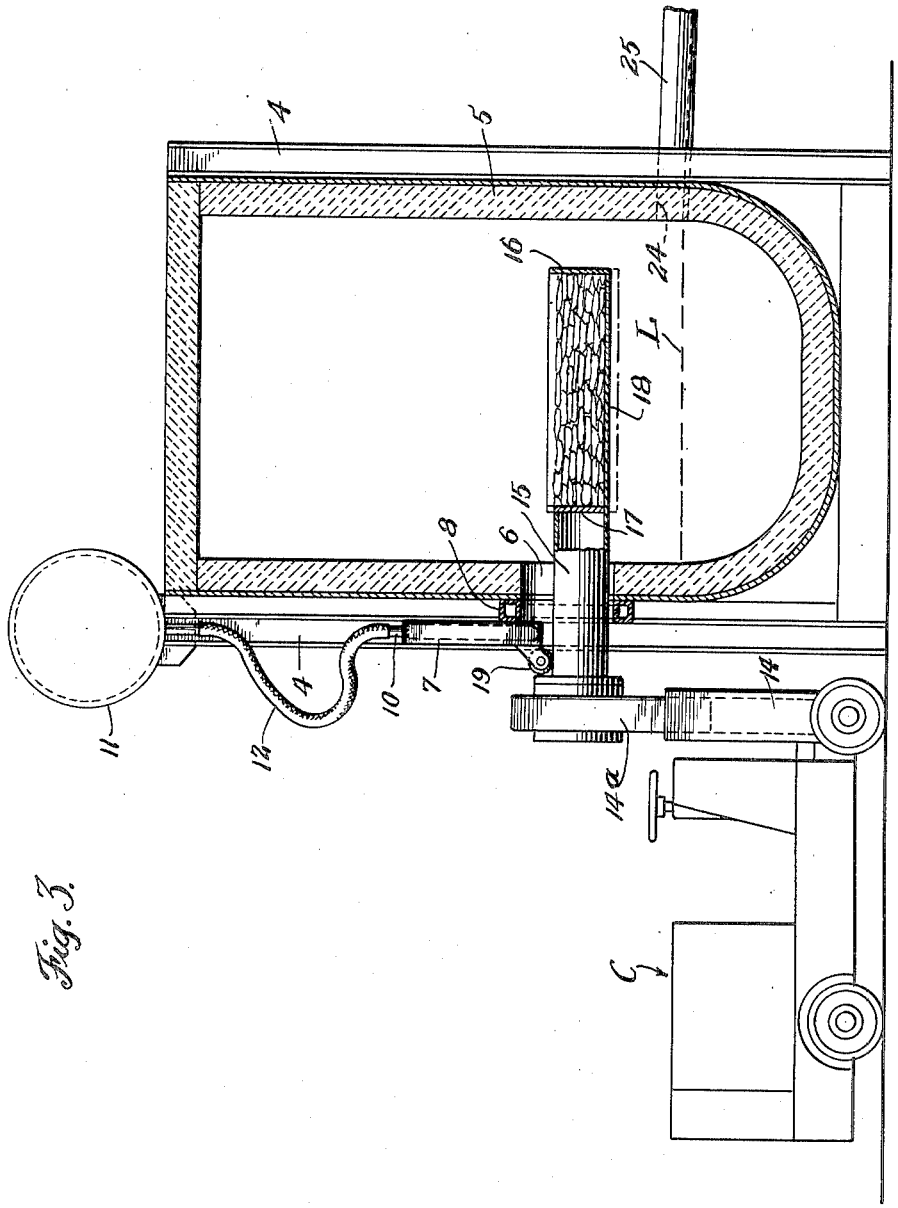
Figure 3 is a sectional view taken substantially as indicated by the line 3—3 on Figure 2.

Referring to the drawings, the first reverberatory furnace is designated by the letter A and the second by the letter B. As best seen in Figures 2 and 3 furnace A is generally rectangular in shape, being considerably longer than the width thereof. The structure of this furnace may be built up between vertical beams such as indicated at 4. The furnace walls are, of course, comprised of refractories such as indicated at 5, this showing being somewhat diagrammatic, since these refractories will ordinarily be built up of brick work in known manner.

At one of the longer side walls of the furnace (the side appearing in Figure 2), a series of charging openings 6 are provided (four being here shown), these openings being located somewhat above the molten charge in the furnace, the level of which is indicated at L in Figure 3.

Each of the openings 6 is provided with a displaceable closure or door 7 which may be mounted for vertical sliding movement between pairs of upright I-beams 4. The doors 7 are advantageously counterweighted as by means of cables 7a extended upwardly and over pulleys and coupled with counterweights (not shown).

For the purpose of protecting the doors a water-cooled jamb or ring 8 may be arranged around each door. The doors themselves are also advantageously of hollow construction and water cooled, as by circulation of water into and out of the pipe connections 9 and 10, which connections are coupled with the water drum 11 by means of flexible hoses 12 and 13. The flexible hoses accommodate the vertical movement of the doors.

Charging of the battery plates or other scrap into the furnace is accomplished by the use of a powered cart generally indicated at C in Figure 3. This cart is adapted to be run by an operator who may drive the cart to a loading point and then drive the cart to the furnace for charging of a load or batch through one of the charging openings 6. At the front of the cart is a standard 14 in which a support 14a is mounted for controlled vertical movement. The support 14a carries a projecting tube 15 which may conveniently be made up of a length of sheet metal pipe, for instance of about one-foot diameter. The remote end of this pipe may be slit and cut out in order to provide a lateral opening at one side thereof and end walls 16 and 17 are provided in order to define a compartment to receive the charge or load to be delivered into the furnace. This construction provides in effect an elongated shovel or spoon 18 which is adapted to be projected into the furnace through one of the openings 6, the tubular portion 15 constituting a handle which is carried on the support 14a. The mounting of the handle 15 on the support 14a is arranged to provide for rotation of the spoon about the axis of the tube 15, in order to dump the charge introduced into the spoon after it has been projected into the furnace.

Figure 1:
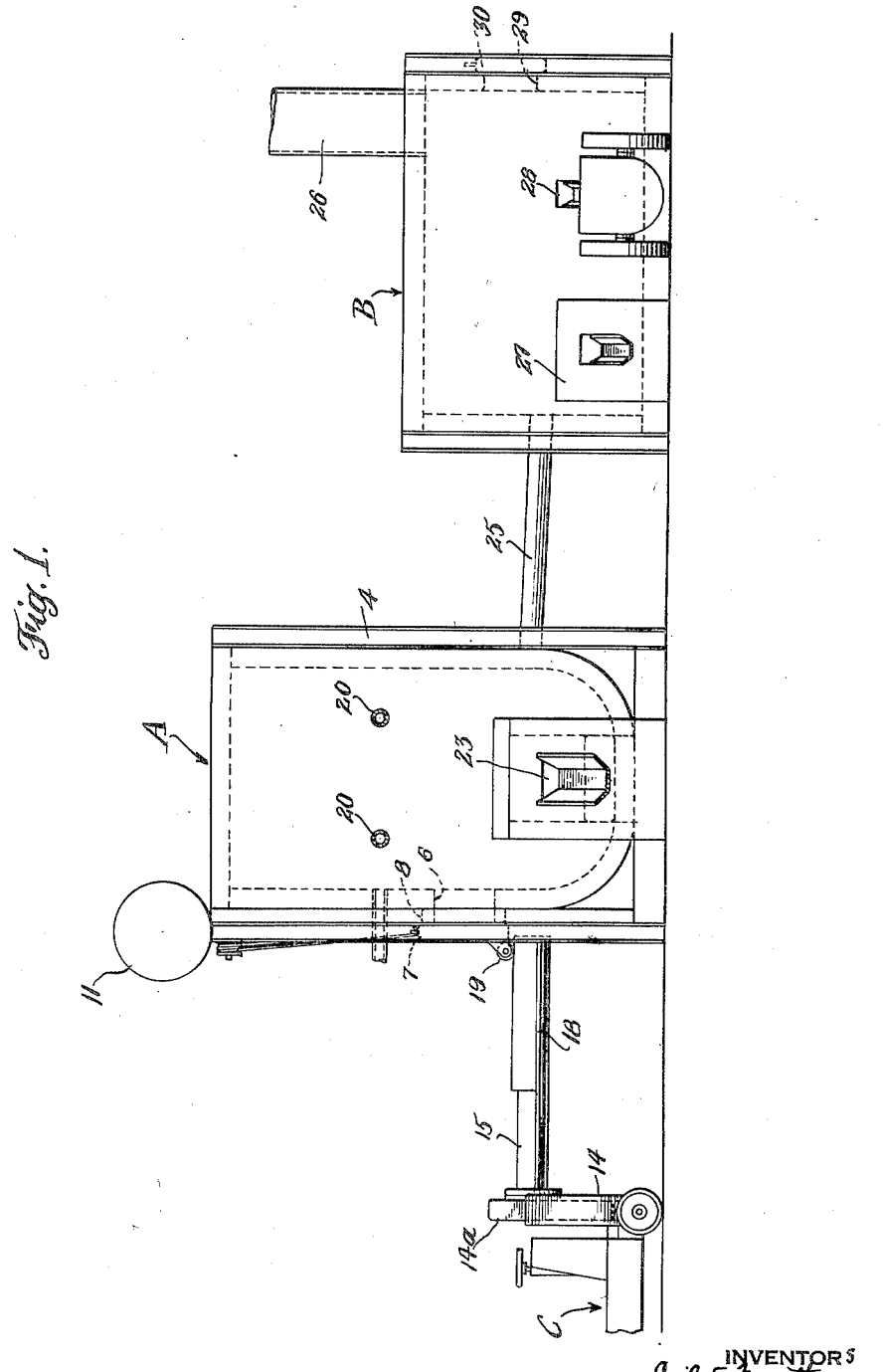
Figure 1 is an elevational view of two reverberatory furnaces utilized according to the invention.

Each of the doors 7 is provided with a roller 19 mounted with its lower edge slightly below the lower edge of the door itself, so that in effecting the introduction of a charge, the operator may bring the cart C into the position shown in Figure 1 and may then operate the controls to raise the support 14a, in consequence of which the engagement of the spoon 18 with the roller 19 will automatically displace the door upwardly and provide for entrance of the spoon through the opening 6 into the furnace. After the upward displacement of the door, the operator of the cart drives the cart forward until the spoon is located within the furnace as indicated in Figure 3, whereupon the control is operated to rotate the spoon and dump the charge in the furnace.

In connection with the foregoing charging system it may be mentioned that the charging is effected thereby in a simple and convenient manner, with a minimum handling of the lead scrap. It is also of importance that the operator is well protected during the charging operation, since the door is opened by virtue of engagement with the spoon, so that as the door uncovers the opening 6, the spoon itself blocks off a substantial portion of the opening.

A still further advantage of the charging system above described is that the charge may readily be dumped in the furnace in the mid region thereof without appreciable contact with the refractories at the side walls. This is an important factor, since the dumping of scrap material in a manner to strike or slide over the refractories damages the refractories and causes undue wear, thereby requiring more frequent replacements.

The provision of a multiplicity of charging doors distributed lengthwise of the furnace is also of advantage in order to more uniformly distribute the charge therein.

It may still further be noted that the provision of the charging doors in the side wall of the furnace is of distinct advantage over charging through the roof or arch of the furnace, since the provision of charging openings in the arch tends to weaken the arch construction.

In the operation of the first furnace, gas or other fuel may be introduced, for instance through connections indicated at 20 in Figure 2. An off-take to a stack is indicated at 21. Lead may be tapped from this first furnace in the manner indicated in the sectional part at the right of Figure 2, which shows a trap 22 from which the lead may be tapped as from the tap hole 23. This tapping of lead is preferably done periodically, the tap hole 23 being normally closed with the common clay plug or the like.

Slag is periodically tapped from the first furnace through a tap hole indicated in Figure 3 at 24. The tapped slag is conveyed by the trough 25 to the second reverberatory furnace B (see Figure 1) wherein further refining is effected. Furnace B may be of simple rectangular shape and of usual construction, having appropriate fuel burner means and an off-take 26. Lead may be tapped from furnace B from a trap 27 of the same general type as described above in connection with Figure 2, and slag may be tapped from furnace B through a tap hole 28.

Furnace B also desirably is provided with a charging opening 29 having a displaceable door 30 which may be arranged in the same general manner as the door 7 above described. This charging opening is utilized for the introduction of refining agents, preferably coke and sodium carbonate as described hereinafter.

In the operation of the equipment described above, it is found that by virtue of the two-stage refining, it is possible to obtain much more lead of high purity than is practicable with other refining systems. Thus, the metal tapped from furnace A is found to be of exceptional purity ranging to as high as 99+ percent lead. Other metal values, notably the antimony commonly present in scrap lead materials, become concentrated in the metal tapped from the second furnace.

In a typical operation, the battery plates are charged into the first furnace without addition of refining agents and in the second furnace we prefer to introduce both coke and sodium carbonate. However, in the overall refining of the total metal values, this two-stage reverberatory system effects the refining with considerably less use of refining agents than is necessary in other processes.

The improvements resulting from the treament of scrap lead in the equipment of this invention will appear still more clearly from the following analysis of a typical refining operation.

Thus, in a typical operation, battery plates charged into the first furnace averaged 68.5% lead, 3.5% antimony, 3% sulfur, and the balance other impurities. For each 100 lbs. of plates charged into the furnace 50 lbs. of metal was tapped from the first furnace, this metal comprising 49.62 lbs. of lead (99.25%) and 0.38 lbs. antimony (0.76%). Moreover, on the basis of each 100 lbs. of battery plates charged, 25 lbs. of slag were tapped from the first furnace into the second. This slag contained 16 lbs. (64%) lead, 3 lbs. (12%) antimony, .75 lbs. (3%) sulfur, and 5 lbs. (21%) oxides and impurities.

10% sodium carbonate and 8% coke were also charged into the second furnace.

On the basis of each 100 lbs. of battery plates charged into the first furnace, the metal tapped from the second furnace comprised 14.6 lbs. of which 14 lbs. (95.5%) was lead and .6 lbs. (4.5%) was antimony. The slag from the second furnace totaled 8 lbs. (for each 100 lbs. of plates initially charged into the first furnace) and this slag comprised .4 lbs. (5%) lead, 2.1 lbs. (26%) antimony, and the balance sulfur and other impurities.

From the foregoing it will be seen that the two-stage refining as carried out in the equipment of the invention is highly effective in the production of soft lead, this lead being derived from the first furnace. The metal from the second furnace is also a valuable product and may either be used as such or may be subjected to other refining treatment, for instance to the known types of treatments in lead softening pots.

The invention contemplates still another feature, i. e., the utilization of some of the metal tapped from the second furnace for reintroduction into the first furnace. According to this feature, lead pigs formed from the metal tapped from the second furnace are placed in the bottom of the spoon 18 and the spoon then filled with the scrap material. When such a charge is introduced into the first furnace the inverting of the spoon and dumping of the charge results in location of the lead pig on top of the mass of material introduced. This has been found to be of distinct advantage because the melting of the hard lead results in trickling of this lead downwardly through the scrap material and slag layer, thereby causing the melted lead to give up antimony to the slag. Such recycling of some of the metal further promotes the production of soft lead.

It will be understood that for the purpose described just above, hard lead from some other sources may be used in pig form and introduced into the first furnace with the charge of battery plates or other scrap.

The processing above described using the equipment of this invention involves a minimum of handling of the scrap material and of other materials at all stages of the treatment. The system of the invention is also effectively operated in a substantially continuous manner and with the necessity for a minimum of attention.

This application is a division of our copending application Serial No. 219,628, filed April 6, 1951, now abandoned, for "Method and Apparatus for Refining Lead Scrap."

We claim:

1. In combination, a lead scrap refining furnace and equipment for charging the furnace with scrap lead material, including an upright furnace wall having a charging opening with a door located externally of the furnace and mounted for upward movement, said door being provided with a roller extended along and below the lower edge of the door; a charging container, mounting means providing for movement of the container horizontally into the furnace through said charging opening, and mounting means providing for movement of the container in a vertical sense, said container having an upwardly presented surface adapted to engage the roller at the under side thereof for opening the door when the container is moved upwardly, said surface also extending horizontally along the container to provide for rolling of the roller along the container as the container is introduced into the furnace, said container being dimensioned so that when the container is positioned beneath the door in engagement with the roller and moved vertically it will effectively block off the major portion of the charging opening at all times during the charging operation.

2. A construction according to claim 1 in which both of the mounting means for the charging container are carried on a powered cart adapted to be driven between a container loading point and a position in which the container cooperates with the roller on the door of the furnace and with the charging opening, the mounting means providing for movement of the container in the vertical sense, being constructed to provide for controlled vertical movement of the container and the positioning of the container at an elevation which facilitates the loading thereof, and which also provides for positioning the container at elevations enabling the container and door roller to cooperate and uncover the charging opening and charge the furnace.

References Cited in the file of this patent

UNITED STATES PATENTS

| | | |
|---|---|---|
| 584,051 | Eck | June 8, 1897 |
| 1,329,588 | Dyrssen | Feb. 3, 1920 |
| 1,667,737 | Nichols | May 1, 1928 |
| 1,938,582 | Davis | Dec. 12, 1933 |

FOREIGN PATENTS

| | | |
|---|---|---|
| 2,618 | Great Britain | Feb. 18, 1890 |